United States Patent
Wittenberg

(10) Patent No.: US 7,529,677 B1
(45) Date of Patent: May 5, 2009

(54) METHODS AND APPARATUS FOR REMOTELY PROCESSING LOCALLY GENERATED COMMANDS TO CONTROL A LOCAL DEVICE

(75) Inventor: John W. Wittenberg, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1049 days.

(21) Appl. No.: 11/038,426

(22) Filed: Jan. 21, 2005

(51) Int. Cl.
*G10L 11/00* (2006.01)

(52) U.S. Cl. .................. 704/275; 704/270; 704/270.1; 704/273

(58) Field of Classification Search .................. 704/275, 704/270, 270.1, 273
See application file for complete search history.

(56) References Cited

U.S. PATENT DOCUMENTS

| | | | |
|---|---|---|---|
| 5,774,859 A | 6/1998 | Houser et al. | |
| 6,366,886 B1 | 4/2002 | Dragosh et al. | |
| 6,408,272 B1 | 6/2002 | White et al. | |
| 6,434,526 B1 | 8/2002 | Cilurzo et al. | |
| 6,434,528 B1 | 8/2002 | Sanders | |
| 6,532,446 B1 | 3/2003 | King | |
| 6,604,077 B2 | 8/2003 | Dragosh et al. | |
| 6,631,350 B1 | 10/2003 | Celi, Jr. et al. | |
| 6,718,015 B1 | 4/2004 | Berstis | |
| 6,799,098 B2 * | 9/2004 | Horst et al. | 701/19 |
| 6,963,759 B1 * | 11/2005 | Gerson | 455/563 |
| 2001/0056350 A1 | 12/2001 | Calderone et al. | |
| 2003/0061039 A1 | 3/2003 | Levin | |
| 2003/0074200 A1 | 4/2003 | Kuzunuki et al. | |
| 2003/0078781 A1 | 4/2003 | Julia et al. | |
| 2003/0139933 A1 | 7/2003 | Kimmel | |
| 2004/0054539 A1 | 3/2004 | Simpson | |
| 2004/0093216 A1 | 5/2004 | Ashish | |
| 2005/0044238 A1 * | 2/2005 | Jacob et al. | 709/227 |
| 2006/0009980 A1 * | 1/2006 | Burke et al. | 704/270 |
| 2006/0100881 A1 * | 5/2006 | He | 704/270 |

* cited by examiner

*Primary Examiner*—Qi Han
(74) *Attorney, Agent, or Firm*—Edell, Shapiro & Finnan, LLC

(57) ABSTRACT

A technique for remotely processing a local audio command to control a local device includes: receiving at a local site an acoustic signal and generating a corresponding audio signal; transmitting the audio signal to a remote site; performing speech recognition processing on the audio signal at the remote site to determine whether the audio signal includes a command; performing voice recognition processing on the audio signal at the remote site to determine whether the audio signal has been supplied by an authorized user; generating a command signal in response to the audio signal including a command and being supplied by an authorized user; and transmitting the command signal to a device at the local site to effect a change in a state of the local device.

24 Claims, 4 Drawing Sheets

METHODS AND APPARATUS FOR REMOTELY PROCESSING LOCALLY GENERATED COMMANDS TO CONTROL A LOCAL DEVICE

FIELD OF THE INVENTION

The present invention relates to methods and systems for the remote processing of locally generated commands, such as voice commands, to control a local device, such as a communication device, a media device, a computer, or other electronic device.

BACKGROUND

Voice commands are used in a variety of contexts to control electronic devices. Often, devices are capable of receiving spoken commands, performing speech processing to determine what the command is, and then responding to the command by performing the operation indicated by the command. In certain cases, it may be desirable to control a device with voice commands in this manner but nevertheless undesirable to include the hardware or software necessary for interpreting commands within the device itself. For example, speech processing software (i.e., software that processes audio signals to identify spoken words within the audio signal) can require significant memory capacity and can be processing intensive. Such processing and memory demands may undesirably increase the cost and size of an electronic device due to the need for increased memory and processing capability. Further, in a network of such devices, updating command processing software would require downloading new software to each device, which may be cumbersome and time consuming.

Another option would be to control a local device by processing command signals remotely. Remote processing of commands is known in a number of contexts. For example, many wireless telephones include a hands-free operation feature that allows the user to call a particular telephone number via a spoken command, e.g., "call home." In this case, a local device (the wireless telephone) receives a voice command which is used by the network to establish a connection between the local device and a specified destination. The state of the local device is not controlled by such commands, but rather the state of the network is controlled.

Speech processing is also used with other mobile devices. For instance, a two-way wireless communication device can use network-based speech recognition resources to augment the local user interface. In particular, the wireless communication system uses a remote voice recognition server system to translate voice input to symbolic data that can be processed by mobile devices.

Further, it is well known to use spoken commands to interact via telephone with a menu-driven system or the like. For example, many automated phone answering systems present a caller with a list of options that may be selected by pressing a keypad button or by audibly stating a word that corresponds to the command. Likewise, current telephone directory assistance services generally ask the caller to say the state and city for which information is desired, and the response is processed by a speech recognition system prior to proceeding to the next question or prior to being connected to a live operator. In these examples, speech commands may be interpreted remotely; however, the commands are not used to control the local device, i.e., the telephone from which the call is being made.

It is also known to control devices, such as cable-supplied televisions, by calling a certain telephone number and entering commands via the telephone keypad to cause a remote processor to send control commands to the cable box controlling the television. Here, a local command is remotely processed to control a local device. However, since a telephone keypad is used, this scheme does not involve voice commands or a speech recognition processing.

Moreover, speech processing has been used with computer internet telephony. For instance, when making connections between network telephones on a computer network, computer network IP telephones are connected using a speech recognition engine and an IP address database on an internet server.

Another known use involves remote processing of locally captured speech to control a local visual display. In particular, human speech is used to control a visual display of a device such that the audio input is transmitted to a remote processor for speech recognition, visual update instructions are generated and sent to the local device, and the visual display of the local device is updated.

All of the foregoing examples lack the capability to provide security via the command system. Thus, for example, if an unauthorized person gains access to the portion of the system that receives voice commands, that person can instruct the system to perform unauthorized commands which may be harmful. There are a numerous circumstances in the government/military, commercial, and private sectors where it would be advantageous to control a local device with a locally-generated voice command without placing the demands of speech processing on a local device and with the capability to provide a significant degree of security in the process of interpreting and carrying out voice commands.

SUMMARY

According to the present invention, there is provided a method and system for the remote processing of locally generated voice commands, and more particularly, for controlling a local device operated by an operator at a local site, where the local device can be an electronic device capable of operating in a number of states, modes or configurations. The local device can be, for example, a military or public-safety radio, a wireless telephone, a television, a computer, a security system for a premises or vehicle, etc. The operator controls the local device by speaking voice commands. The voice command constitutes an acoustic signal that travels through the air and is received by a microphone of a local command processor. The local command processor generates a corresponding audio signal (e.g., an electric or electromagnetic equivalent of the acoustic signal) and sends the audio signal to a remote processor via a communication link. The remote processor, such as a server, performs speech recognition processing on the audio signal to determine the command to be carried out and performs voice recognition processing to determine whether the person who issued the acoustic voice command is authorized to do so. Specifically, the remote processor can include a voice recognition processor that attempts to match the voice of the operator to a database of authorized operator(s). If a command is identified and the voice is authenticated, the remote processor sends a command signal to the local device via a communication link to control the state of the local device. The communication links can be of any type or combination of types (phone network, Internet, wireless link, optical, metal wire, etc.) and can employ any of a variety of signal formats and protocols.

The local device whose state is altered by the command signal received from the remote processor can include the local command processor, which could be the case, for example, where the local device is a two-way radio (e.g., a military radio), a wireless telephone, or other devices capable of accepting a voice or acoustic command. More generally, however, the local command processor need not be part of the local device, particularly where the local device is not typically equipped with a microphone or the capability to receive or interpret an acoustic signal, e.g., where the local device is a television, a security system, computer, or a component of a computer network. In this case, the local command processor can be a separate device such as a wireless or landline telephone. The returning command signal can then be received by the local device or a device that controls the local device, such as a cable box, processor, etc.

Examples of acoustic commands that could be issued to control a local device and processed according to the invention are as follows. Where the local device is a two-way radio or the like, a typical command might be "switch to sub-net 3," which when interpreted and authenticate by the remote processor would alter the state of the radio such that the radio, and possibility other networked radios, are tuned to a particular sub-network. Where the local device is a television, a typical command might be "switch to channel 7" or "order pay-per-view program 25." For a cell phone, a typical command might be "switch to vibrate only mode." For a computer, a typical command might be "download Windows updates." For a security system, a typical command might be "unlock front door, access code 13572."

The system of the present invention has particular applicability in networked systems where control of a local device requires interaction or authorization of a remote party or entity in addition to speech and voice processing of a voice command. For example, in a premises or vehicle security system, an end user or customer will be present at a local site along with the local device to be controlled (e.g., a local security control processor). The customer interacts with a service provider, such as a security company, which in turn relies on a third party that supplies the remote processor configured to receive and interpret selected voice commands and to supply corresponding command signals to the local device. The service provider can relay signals between the customer and remote processor or monitor the communications therebetween and control various aspects of the process, such as billing.

The above and still further features of the invention will become apparent upon consideration of the following definitions, descriptions, and descriptive figures of specific implementations thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
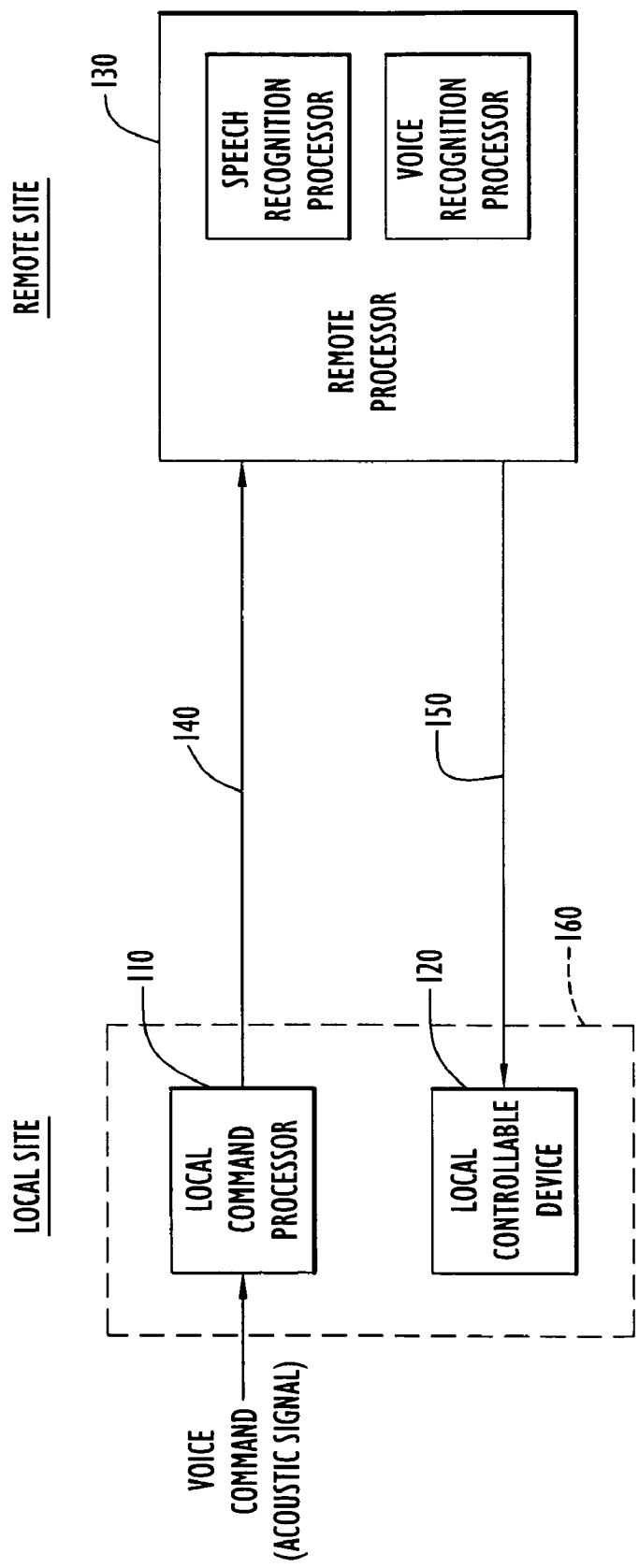
FIG. 1 is a functional block diagram that illustrates a system for implementing the present invention.

Referring to FIG. 1, a block diagram for a system for controlling a local device using remote speech and voice recognition processing according to an exemplary embodiment of the present invention includes a local command processor 110, a local controllable device 120, a remote processor 130, a communication link 140 between the local command processor 110 and the remote processor 130, and a communication link 150 between the remote processor 130 and the local controllable device 120. Local command processor 110 and local controllable device 120 are co-located at the same site and are typically within a region occupied by a user. Specifically, local command processor 110 is typically within proximity to the user (e.g., within hand's reach) to permit reception of acoustic voice commands issued by the user. Local controllable device 120 is typically within reach of the user or within visual range or earshot of the user, such that the user is able to perceive in some manner that the state of the local controllable device has been changed in response to the voice command being carried out. Optionally, local command processor 110 and local controllable device 120 can be two separate devices. Another option is that a common local device 160 includes both local command processor 110 and local controllable device 120 in a single device (a dashed box is used for local device 160 in FIG. 1 to indicate that including these two devices in a single local device is optional).

Local command processor 110 and local controllable device 120 are typically incorporated into a common local device when the local device commonly includes a microphone, such as a wireless telephone or a two-way radio. In contrast, the local command processor is typically a separate device when the local controllable device does not normally include a microphone, such as a television. Optionally, the local command processor 110 and the local controllable device 120 can be components of a networked system, such as a computer or communication network or a security system for a premises (e.g., a home, building, or facility) or for a vehicle (e.g., an automobile or truck).

Local command processor 110 includes a microphone or similar mechanism for picking up acoustic signals. As used herein, an acoustic signal comprises pressure waves that travel through a medium, such as air. Within the range of audible frequencies, such an acoustic signal is perceptible as sound (i.e., sound waves).

Figure 2:
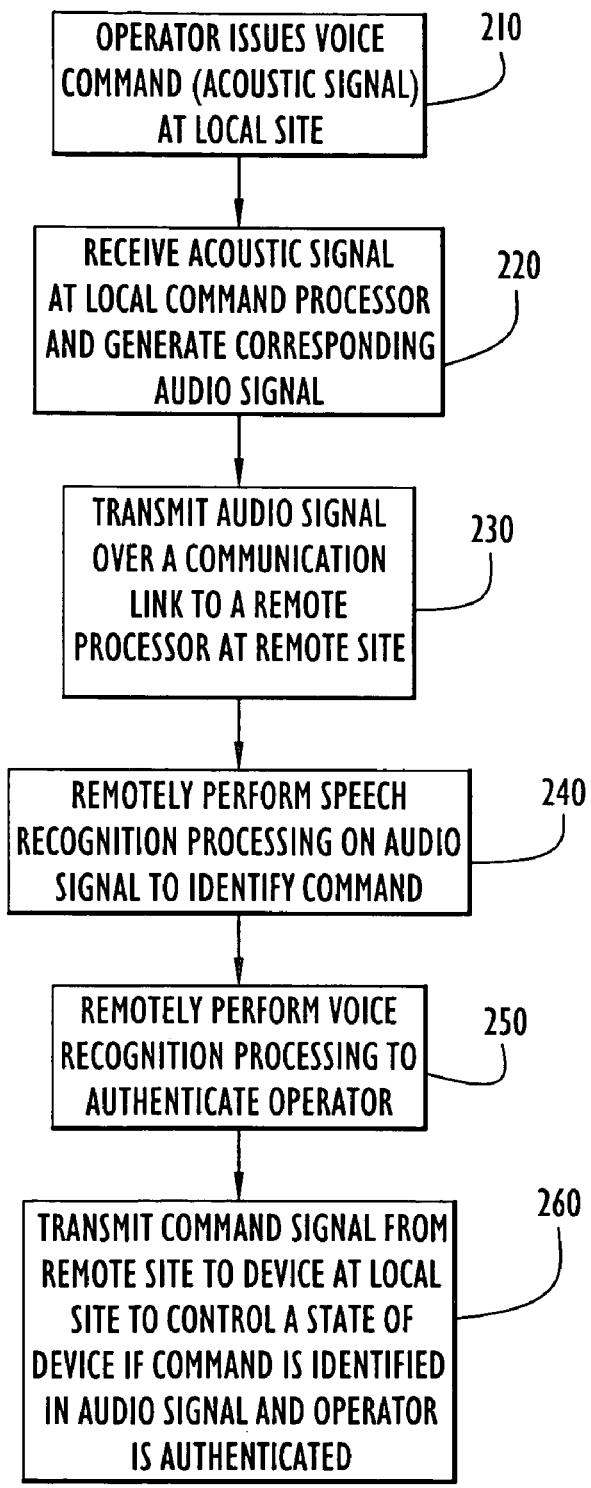
FIG. 2 is a flow diagram that illustrates operation of the system shown in FIG. 1 in accordance with an exemplary embodiment of the present invention.

In FIG. 2, a flow diagram illustrates the operations performed according to an exemplary embodiment of the invention using the arrangement shown in FIG. 1. In operation 210, to control the local controllable device 120, the operator or user at the local site issues an audible voice command (which is an acoustic signal) which can be detected by the microphone of the local command processor 110. The voice command may be directly spoken by a human or, optionally, can be a recorded reproduction. Once an acoustic signal is detected, local command processor 110 converts the acoustic signal to an audio signal, such as an electrical or electromagnetic representation of the acoustic signal (operation 220). The audio signal can be an analog signal or can be sampled to form a digital signal.

Communication link 140 can employ any one or combination of communication media and protocols to convey the audio signal from the local site to a remote site (operation 230). For example, the communication medium can include conductive (copper) wires, coaxial cables, optical fibers, wireless channels, and combinations thereof. The audio signal can be conveyed via any of a variety of communication schemes including, but not limited to, a conventional landline telephone network, RF links, private or public data networks (e.g., an intranet, wide area network, or the Internet), satellite communications, and combinations thereof. Likewise, the audio signal can be transmitted as an analog signal or as a digital signal using a suitable transmission protocol (e.g., a TCP/IP compliant protocol, packetized data, VOIP, etc.). Depending on the nature of communication link 140, local command processor 110 includes suitable means for processing the audio signal for transmission over communication link 140, such as a modem, an RF transmitter and antenna, etc.

Optionally, some degree of pre-processing can be performed on the audio signal by the local command processor. For example, if the received acoustic signal is excessively long, the local command processor can buffer and/or compress the signal for efficient transmission. Conversely, if the audio signal contains rapid speech or is unusually short, the local command processor can expand or slow down the audio signal prior to transmission.

Referring again to FIG. 1, remote processor 130 is located at a remote site that is geographically separate from the local site (generally, not in the same building or facility). Preferably, remote processor 130 supports a plurality of local devices in a networked system. For example, the remote processor may support a home security system from a central site, where the local sites are the homes or businesses of individual customers.

Remote processor 130 includes at least a speech recognition processor and a voice recognition processor. Although not shown in FIG. 1, remote processor 130 also includes a receiver capable of receiving audio signals from communication link 140 and a transmitter for transmitting resulting command signals over communication link 150 (e.g., a modem). Upon reception of an audio signal, the speech recognition processor attempts to identify a voice command within the audio signal (operation 240 in FIG. 2). The speech recognition processing involves performing any of a variety of signal processing techniques for identifying spoken words or sets of words within an audio signal. Such techniques and algorithms are well known in the art and not described here in detail.

Preferably, the speech recognition processor includes a stored list of valid commands that can be used to control the local device and is tailored to identify only these specific valid commands. For example, in the case of a security system, only specific sets of words may constitute valid commands, such as "unlock front door," "lock windows," or "arm perimeter alert system." Likewise, passwords or security codes can be used with commands for additional security. Where the local device is a television, the valid commands may be the numbers of television stations or specific programs to be viewed. With a wireless telephone or two-way radio, the commands may relate to operational configuration of the telephone or radio, such as a command to enter a vibrate mode for incoming calls or to switch to particular channel or network for further communications.

Voice recognition processor analyzes audio signals received at the remote processor to determine whether the person issuing the voice command is authorized to issue the command (operation 250 in FIG. 2). The processing involves comparing the characteristics (e.g., frequency spectrum, speech patterns, etc.) of the audio signal to stored voice information to determine whether the audio signal voice matches that of an authorized user. Algorithms and processing techniques for performing voice recognition are well known in the art and not described here in detail. Voice recognition processing provides an additional degree of security, which prevents an unauthorized person at the local site from affecting or manipulating the local controllable device in some manner.

For example, in the case where the local controllable device is a television, voice recognition processing can prevent an unauthorized person (e.g., a child) from accessing certain channels or ordering pay-per-view shows, whereas an authorized person (e.g., a parent) can be authorized to access all channels by issuing voice commands via a telephone or the like.

In the case of a security system, voice recognition permits only authorized users to control some aspect of the system with a voice command, such as accessing a premises or vehicle. In the case of a computer network, voice recognition prevents unauthorized users from accessing certain information, viewing certain websites, reconfiguring equipment, downloading software, etc.

While speech recognition processing and voice recognition processing are shown sequentially in the flow diagram of FIG. 2, it will be appreciated that these two operations can be performed sequentially in either order or in parallel. Optionally, where speech and voice and recognition processing are performed sequentially, if the first performed processing fails to produce an acceptable result (i.e., no valid voice command is detected or no authorized voice is identified), the subsequent processing need not be performed.

In operation 260, if a voice command is successfully identified via the speech recognition processing and if the voice recognition processing authenticates that the voice is that of an authorized operator, then the remote processor transmits a command signal to local controllable device 120 (located at the local site) over communication link 150 in order to alter a state of the local controllable device 120. The command signal is preferably a digital signal having a format that is recognizable to local controllable device 120. Communication links 140 and 150 can be the same, two-way communication link or can be separate communication links. Communication link 150 can employ any one or combination of communication media and protocols, such as those previously listed for communication link 140; however, in general, communication link 150 need not necessarily be of the same type as link 140.

Local controllable device 120 includes a receiver, modem, processor, or other components capable of receiving and interpreting the command signal. The mechanism for receiving the command signal need not be integrally formed with the component of the local controllable device whose state is to be altered. In general, the remote processor may be implemented as hardware, software, or a combination thereof. Likewise, the processing performed by the local command processor and local controllable device can be implemented with hardware, software, or a combination thereof.

The following are some examples of states of local controllable devices that can be altered via a command signal. It will be appreciated that the invention is not limited to these specific examples. In the context of a two-way radio, such as a military or public safety radio, the command signal may instruct the radio to change an operational status (e.g., on/off, standby mode, sleep mode, etc) or change a setting (e.g., increase/decrease volume, change transmission settings, change frequency, etc.). If the local device is a television, virtually any of the conventional operations that can be performed via a remote control can be carried out via a remotely processed voice command (e.g., changing channels, changing volume, on/off, adjusting setting, recording, adjusting screen settings, blocking channels, etc.). In a security system, a door or gate can be changed from a locked state to an unlocked state or vice versa, or a sensor (e.g., motion detector, heat detector, smoke detector, etc.) can be instructed to be in an armed (on) state or an unarmed (off) state.

In an appropriate setting, an operator can effect a global change through a locally issued "broadcast command," which can result in a state change in the operator's local device as well as other related devices. For instance, in a tactical field setting, an on-scene commander could change the transmitting frequency of his radio (i.e., local device) along with the frequency of the radios of the units with whom he must communicate.

Figure 3:
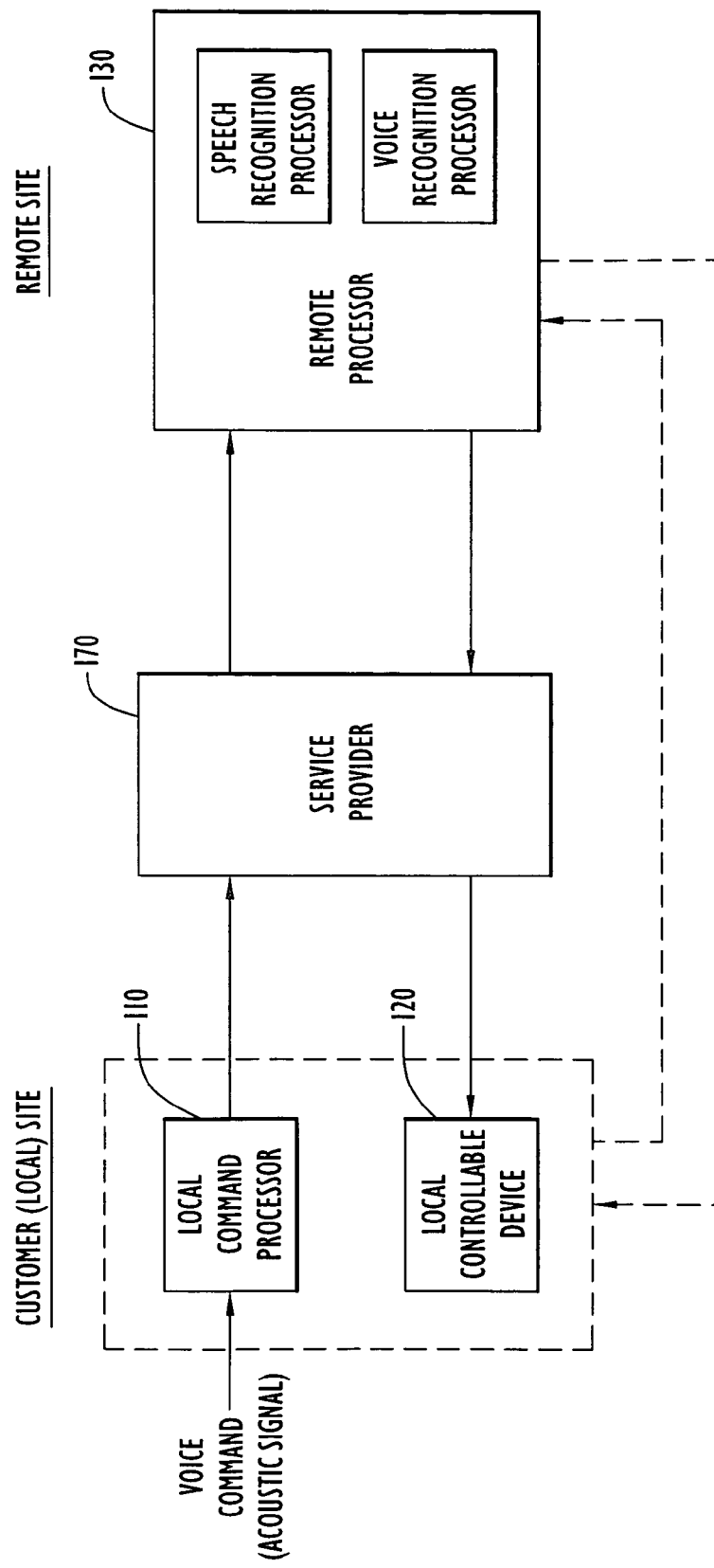
FIG. 3 is a functional block diagram that illustrates another implementation of the present invention.
Figure 4:
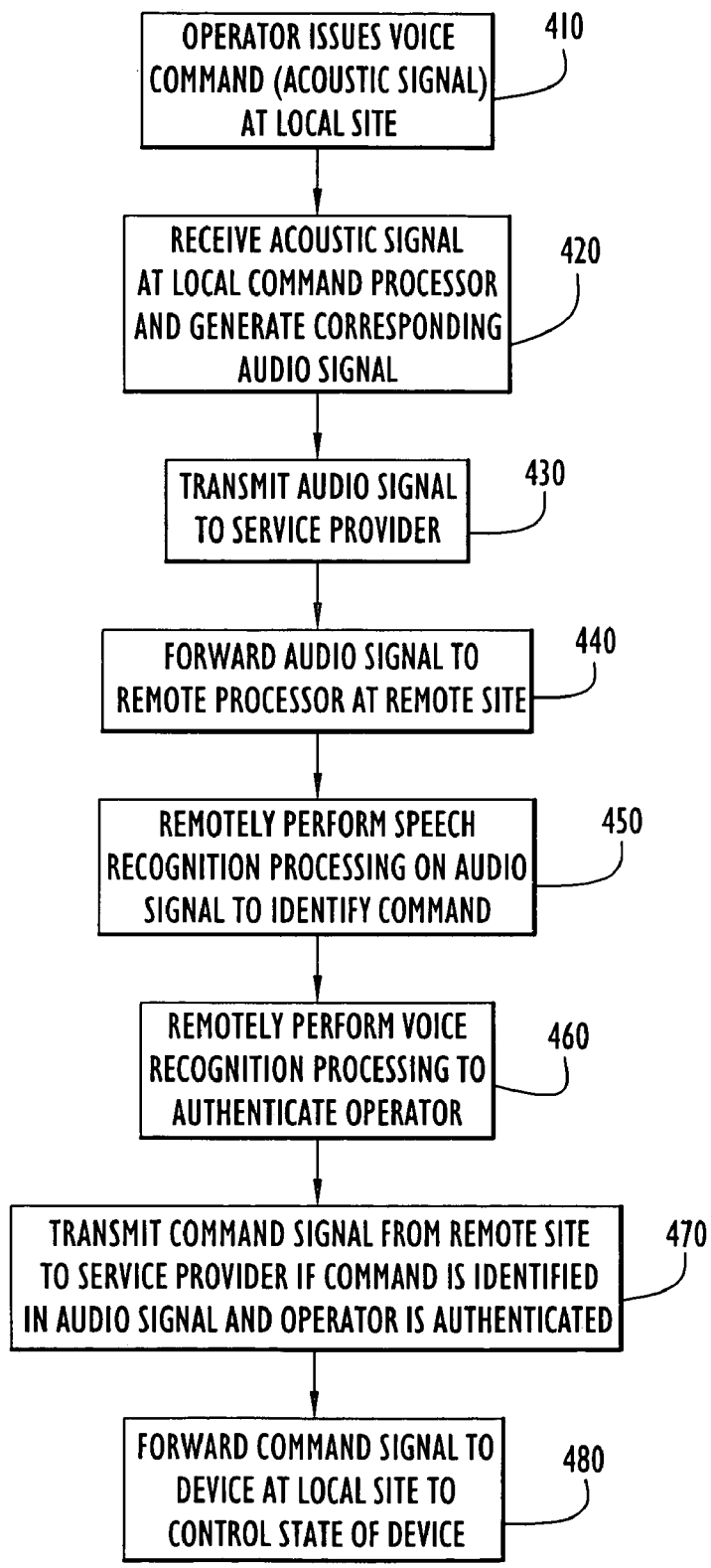
FIG. 4 is a flowchart that illustrates the operation of the implementation of the present invention shown in FIG. 3.

A particularly useful configuration for the system of the present invention is now described in connection with FIGS. 3 and 4, where a remote service provider provides a service to a customer at a local site. In this scheme, a local operator (customer) issues a voice command at the local site to control the local controllable device 120, and the local command processor 110 generates the audio signal in the manner described above (operations 410 and 420 in the flow diagram of FIG. 4). In operation 430, the local command processor transmits the audio signal to the service provider 170 at a service provider site via a communication link. The service provider then forwards the audio signal to the remote processor 130 at the remote site (operation 440), which performs speech recognition processing and voice recognition processing as described above (operations 450 and 460). In operation 470, if a valid voice command is identified in the audio signal and if the operator is authenticated as an authorized operator, remote processor 130 transmits a command signal to the service provider. The service provider then forwards the command signal to the local controllable device 120 at the local site to control the state of the device, as described above (operation 480).

In this manner, the service provider is intermediate to the local site and the remote site, and the audio signal and the resulting command signal are routed through the service provider. This arrangement allows the service provider to monitor and manage the command activity and the current state of the local controllable device at the local site as well as the signal traffic to and from the remote processor at the remote site. Thus, for example, the service provider can be alerted by the remote processor if a number of failed attempts are made to control the local controllable device, and business aspects of the service to the customer that relate to command activity, such as billing matters, can be managed by the service provider. For example, when the command is not authenticated, i.e., an imposter is attempting access, notification of location of the imposter to relevant authorities is possible since the location of the local site from which the audio signal originated is known.

The remote processor, which provides speech and voice recognition processing, can be a secondary service provided to the service provider by a separate entity. In this manner, an entity specializing in speech and voice recognition processing can offer audio signal processing services to a number of service providers, which can be in different industries or lines of business. This scenario allows the audio signal processing to be modified or upgraded easily, since the processing is centralized at one or more remote sites dedicated to remote audio signal processing.

According to another arrangement, the service provider can monitor or manage activities at the local site and remote site, but transmission of the audio signal and corresponding command signal can occur directly between the local site and the remote site (i.e., these signals are not routed through the service provider site). This arrangement, which may reduce signal delays and system complexity, is depicted in FIG. 3 with dashed lines extending between the local site and the remote processor.

According to yet another option, the remote processor can be located directly at the service provider site. In this case, speech and voice recognition hardware and/or software can be supplied to the service provider and integrated into the service provider's system support scheme.

A security system is one example of a system involving a customer, service provider, and an audio signal processing service. The local site can be a customer's home, vehicle, or business premises that is linked via a network to a service provider's central control site that monitor many such vehicles or premises. The security service provider may subscribe to or pay a licensing fee to use the speech and voice recognition processing of a third party, which is adapted to recognize certain voice commands and certain authorized users, depending on the particular customer or the particular service provider.

The present invention advantageously permits a local operator to control a local device using voice commands without requiring the complex processing and memory capabilities associated with speech and voice recognition processing to be incorporated into a local device. By performing complex speech and voice recognition processing remotely, the local device can have fewer components, be smaller, use less power, and cost less than a device that performs these operations locally. Further, upgrades to speech and voice recognition software would not require significant reconfiguration of the local device. Having described specific features, details, and implementations, it is believed that other modifications, variations and changes will be suggested to those skilled in the art in view of the above description. It is therefore to be understood that such variations, modifications, and changes are believed to fall within the scope of the invention as defined by the appended claims. For example, the command may be an analog signal. Alternately, the command may be a digital signal or an analog signal converted to a digital signal.

What is claimed is:

1. A method for remotely processing a locally-generated voice command to control a local device, the method comprising:
   (a) receiving at a local site an acoustic signal and generating an audio signal from the acoustic signal;
   (b) transmitting the audio signal to a remote site;
   (c) performing speech recognition processing on the audio signal at the remote site to identify a voice command from the audio signal;
   (d) performing voice recognition processing on the audio signal at the remote site to determine whether the audio signal has been supplied by an authorized user;
   (e) generating a command signal in response to identifying a voice command from an authorized user; and
   (f) transmitting the command signal to the local device at the local site to effect a change in a state of the local device.

2. The method of claim 1, wherein a service provider provides a service to a customer located at the local site, the method further comprising:
   (g) receiving, at a service provider site, the audio signal transmitted from the local site;
   (h) re-transmitting the audio signal from the service provider site to the remote site;

(i) receiving, at the service provider site, the command signal transmitted from the remote site; and (j) re-transmitting the command signal from the service provider site to the local site.

3. The method of claim 1, wherein a service provider provides a service to a customer located at the local site, wherein the service includes (a)-(f).

4. The method of claim 3, wherein the service provider provides a premises security service or a vehicle security service or both.

5. The method of claim 3, wherein the service provider provides a network security service for a communication or computer network.

6. The method of claim 1, wherein the local device receives the acoustic signal.

7. The method of claim 1, wherein a device separate from the local device receives the acoustic signal.

8. The method of claim 1, wherein the local device is a communication device.

9. The method of claim 1, wherein in the local device is a component of a security system for a premises or a vehicle.

10. The method of claim 1, wherein (a) includes generating a digital audio signal from the acoustic signal.

11. The method of claim 1, wherein (b) includes transmitting the audio signal by at least one of: a wireless link, a wire link, and an optical link.

12. The method of claim 1, wherein the audio signal and the command signal are transmitted over a common, two-way communication link.

13. The method of claim 1, wherein the audio signal and the command signal are transmitted on different communication links.

14. An apparatus for remotely processing a voice command generated at a local site to control a local device at the local site, comprising:

a receiver located at a remote site that is remote from the local site, wherein the receiver is configured to receive an audio signal originating from the local site;

a speech recognition processor located at the remote site, the speech recognition processor being configured to identify a voice command from the audio signal;

a voice recognition processor located at the remote site, the voice recognition processor being configure to determine whether the audio signal has been supplied by an authorized user, wherein the apparatus generates a command signal in response to identifying a voice command from an authorized user; and a transmitter located at the remote site, the transmitter transmitting the command signal to the local device at the local site to effect a change in a state of the local device.

15. The apparatus of claim 14, wherein a service provider provides a service to a customer located at the local site, wherein the audio signal is supplied to the apparatus via the service provider.

16. The apparatus of claim 14, wherein the apparatus supports a security system and the command signal controls a component of the security system at the locate site.

17. A system for remotely processing a locally-generated voice command to control a local device, comprising:

a local command processor configured to receive at a local site an acoustic signal, the local command processor generating an audio signal from the acoustic signal and transmitting the audio signal to a remote site;

a remote processor located at the remote site, the remote processor performing speech recognition processing on the audio signal to identify a voice command and performing voice recognition processing on the audio signal to determine whether the audio signal has been supplied by an authorized user, wherein the remote processor generates a command signal in response to identifying a voice command from an authorized user and transmits the command signal to the local site; and a local device located at the local site and configured to receive the command signal, wherein the local device changes a state of the local device in response to the command signal.

18. The system of claim 17, wherein a service provider provides a service to a customer located at the local site, wherein the audio signal is transmitted from the local site to a service provider site and re-transmitted from the service provider site to the remote site, and wherein the command signal is transmitted from the remote site to the service provider site and re-transmitted from the service provider site to the local site.

19. The system of claim 17, wherein in the local device is a component of a security system for a premises or a vehicle.

20. The system of claim 17, wherein in the local device is a component of a security system for a computer network or communication network.

21. The system claim 17, wherein the local device comprises the local command processor.

22. The system of claim 17, wherein the local device and the local command processor are separate devices.

23. The system of claim 17, wherein the local device is a communication device.

24. A system for remotely processing a locally-generated voice command to control a local device, comprising:

means for generating an audio signal from an acoustic signal received at a local site;

means for transmitting the audio signal to a remote site;

means for performing speech recognition processing on the audio signal at the remote site to identify a voice command;

means for performing voice recognition processing on the audio signal at the remote site to determine whether the audio signal has been supplied by an authorized user;

means for generating a command signal in response to identifying a voice command from an authorized user;

means for transmitting the command signal to the local site; and means for changing a state of the local device in response to receiving the command signal at the local site.

* * * * *